United States Patent
Malone, Jr.

(10) Patent No.: US 6,588,775 B2
(45) Date of Patent: Jul. 8, 2003

(54) CONVERTIBLE HAND CART WITH IMPROVED LOCKING MEANS

(75) Inventor: William E. Malone, Jr., Goshen, IN (US)

(73) Assignee: Gleason Industrial Products, Inc., Goshen, IN (US)

( * ) Notice: Subject to any disclaimer, the term of this patent is extended or adjusted under 35 U.S.C. 154(b) by 0 days.

(21) Appl. No.: 10/000,536

(22) Filed: Oct. 23, 2001

(65) Prior Publication Data

US 2003/0075887 A1 Apr. 24, 2003

(51) Int. Cl.$^7$ ................................................. B62B 5/00
(52) U.S. Cl. ................................ 280/47.18; 280/47.27; 280/651
(58) Field of Search .................. 280/47.18, 47.27, 280/47.34, 30, 637–658, 47.38; 292/126, 128, 173, 178; D8/331, 339

(56) References Cited

U.S. PATENT DOCUMENTS

| | | | |
|---|---|---|---|
| 3,785,669 A | | 1/1974 | Doheny |
| 4,167,281 A | * | 9/1979 | Spencer ..................... 292/216 |
| D364,022 S | * | 11/1995 | Kazmark, Jr. ................ D34/26 |
| 5,476,282 A | * | 12/1995 | Dahl ............................ 280/651 |
| 5,536,034 A | * | 7/1996 | Miller ......................... 280/651 |
| 5,941,543 A | * | 8/1999 | Kazmark, Jr. ............. 280/47.29 |
| 6,302,414 B1 | * | 10/2001 | Berthiaume et al. ..... 280/47.18 |
| 6,308,967 B1 | * | 10/2001 | Stallbaumer et al. .... 280/47.18 |
| 6,328,319 B1 | * | 12/2001 | Stahler, Sr. .............. 280/47.18 |
| 6,364,328 B1 | * | 4/2002 | Stahler, Sr. .............. 280/47.18 |
| 6,488,304 B2 | * | 12/2002 | Krawczyk ................... 280/408 |

OTHER PUBLICATIONS

Harper Trucks, Inc., catalogue on Hand Trucks No. 190, published 1/90, pp. 12–14 along with cover page, Index page re "Multi–Purpose Trucks".

* cited by examiner

*Primary Examiner*—Brian L. Johnson
*Assistant Examiner*—Brian L Swenson
(74) *Attorney, Agent, or Firm*—Edward J. DaRin, Esq.

(57) ABSTRACT

A convertible hand cart convertible between a two wheel hand cart for vertically loading of materials and a four wheel hand cart providing a horizontal material loading platform. The wheel structure for providing the four wheel configuration is pivotably secured to the two wheel structure and movable between the two wheel and four wheel configurations. The two wheel configuration includes structures for locking up the wheel structure for the four wheel configuration thereto. The locking structure is constructed and defined with minimum parts and operable based on vertical sliding action to minimize wear on the locking structure parts. A foot operative mechanism is provided to release the locking structure to permit the wheel structure to be released from a locked up position, hands free, to commence the reconfiguration to the four wheel cart.

14 Claims, 7 Drawing Sheets

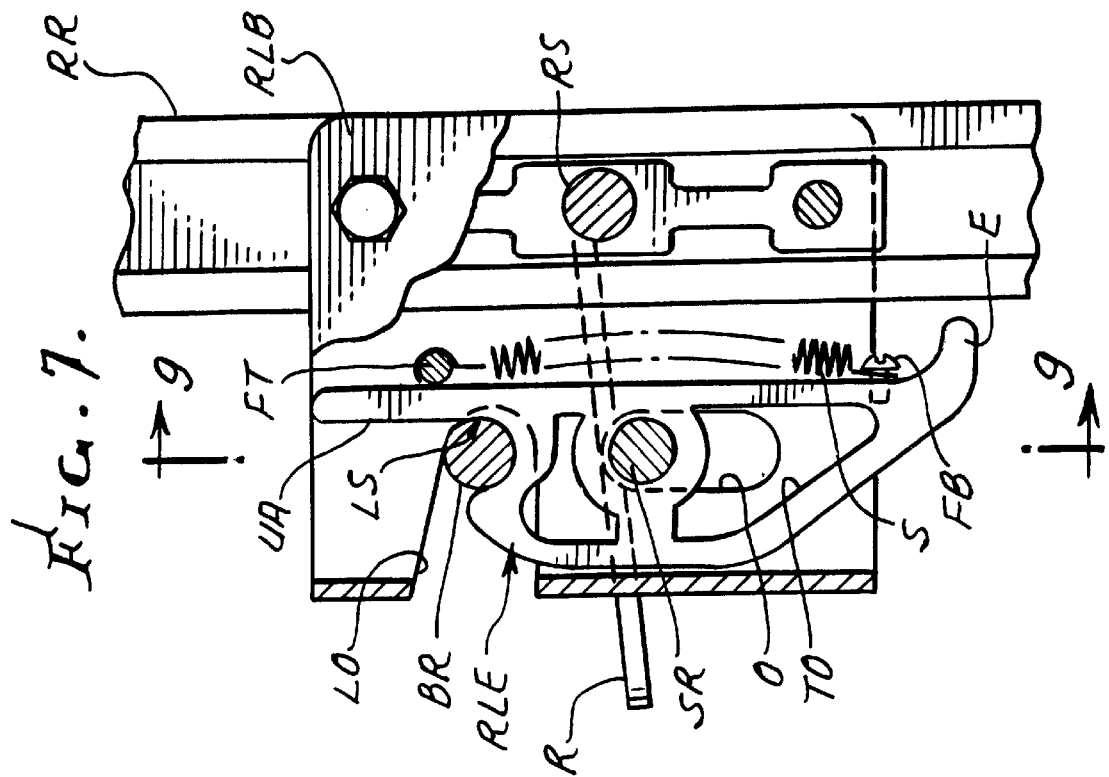
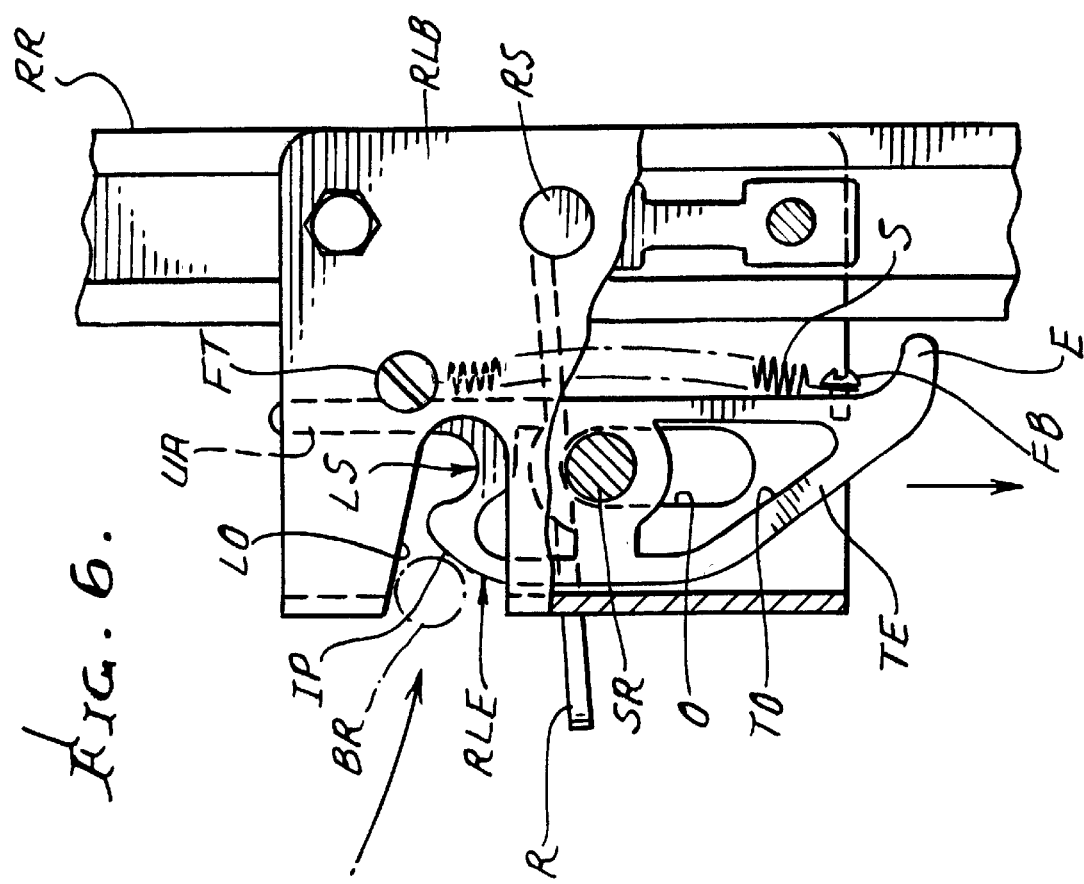

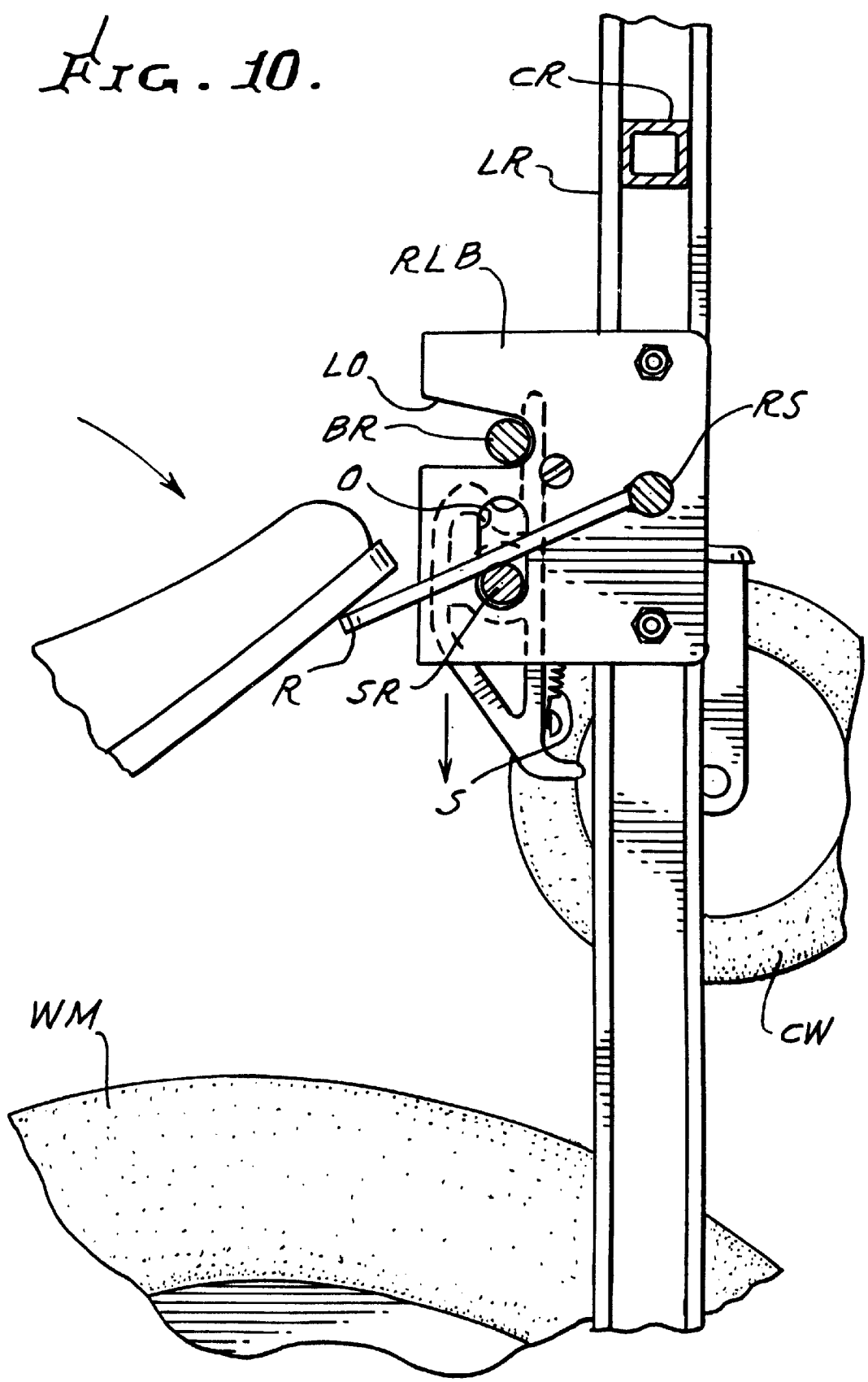

CONVERTIBLE HAND CART WITH IMPROVED LOCKING MEANS

FIELD OF THE INVENTION

The present invention relates to a dual purpose hand cart convertible between a two wheel, upright, or vertical loading hand cart and a four wheel, horizontal loading hand cart with improved means for locking the two wheels for the four wheel configuration to the two wheel structure.

BACKGROUND OF INVENTION

Home Improvement stores carry a variety of items that range in size from simple hardware items to very large items such as lumber or similar bulky goods that require wheeled material transport devices for customers to transport their purchased goods to their motor vehicles or trucks. The two wheeled hand carts are used for transporting small packages that can be vertically stacked on to a two wheel hand cart. Builder's supplies, for example, generally require a wheeled transport device that are beyond the load capacity of a two wheel, hand cart. The dual purpose hand cart that is convertible between a two wheel, upright hand cart and a four wheel, horizontal load supporting platform for stacking bulky items such as lumber or the like has been found suitable for use in these home improvement stores or outlets.

These dual purpose hand carts are well known in the art and are exemplified, for example, by the disclosure in U.S. Pat. No. 3,785,669 for a convertible bulk hand cart. This patent disclosure describes a manually operated, wheeled material handling cart which is convertible between a two wheel hand cart of conventional configuration and a four wheel hand cart having a horizontal load carrying platform for stacking cases of bottled liquids or the like. This prior art device further utilizes a rudimentary locking means for locking the two wheel supporting structure used in the four wheel configuration, to the two wheel configuration yet enables the usual ease of use for the two wheel hand cart without the need for supplying separate material handling devices or specially designed material handling carts for specific purposes.

In all known prior art dual purpose devices of this type the locking devices are generally spring loaded and released to permit the conversion between the two wheel configuration to the four wheel configuration. The patented locking device of the aforementioned U.S. Pat. No. 3,785,669 utilizes a plurality of locking elements that are controlled to rotate between a position locking a latching bar and freeing the bar and thereby permit the user to unfold the wheeled structure to convert the hand cart to the four wheel construction or the platform cart. The experience with such locking mechanism is that it readily wears and as a result renders the latch or locking mechanism loose, effectively reducing its useful life. Accordingly, there is a present need for an improved locking mechanism with a more positive locking action and longer useful life.

SUMMARY OF INVENTION

The present invention provides an improved dual purpose hand cart capable of use as two wheel, upright hand cart and a four wheel, horizontal hand cart with improved means for locking the structure required for conversion to a four wheel cart having a more positive latch or locking function, with less parts required and longer useful life. The locking mechanism is based on the sliding action of the latching rod and associated locking elements rather than any rotary action. The release of the locking mechanism is designed for "hands free" operation when a foot release is operated.

From a broad method standpoint, the improved locking concept for use with a dual purpose hand cart includes the step of providing a two wheel hand cart having spaced, longitudinally extending side rails for pivotably securing a second pair of longitudinally extending side rails arranged in a spaced, parallel relationship with the side rails for the two wheel hand cart. The second pair of side rails includes a brace rod extending between said second pair of side rails and movable therewith. The method further contemplates providing locking means for securement to the side rails for the two wheel hand cart and securing the locking means to the side rails to permit the locking means to slide in a substantially vertical plane for locking and unlocking purposes in response to corresponding forces applied thereto and normally arranged in a locking position. In order to lock up the brace rod, imparting a swinging movement to the second pair of side rails causing the brace rod to impact the locking means to cause the locking means to be momentarily, slidably moved out of its locking position so that the brace rod assumes the locking position and then the locking means automatically moves back to the locking position for locking up the brace rod. The aforementioned method further contemplates providing manual release means, operable hands free, arranged with the locking means for causing the locking means to slide away from its locking position with the brace rod to permit the commencement of the conversion to the four wheel hand cart upon the application of releasing force to the release means.

From a structural standpoint, the present invention contemplates a dual purpose hand cart comprising a two wheel hand cart characterized as including a pair of spaced, longitudinally extending side rails and a second pair of spaced, longitudinally extending side rails carrying wheel means individual to each of the side rails and a brace rod extending between the side rails. Pivot means secures the second pair of side rails to the side rails for the two wheel cart so that the second pair of rails assumes a spaced, substantially parallel relationship with the side rails for the two wheel cart and is swingable away from the parallel relationship to permit the wheels for the second pair of side rails to engage a supporting surface. Locking means are secured to the side rails for the two wheel hand cart for locking up and unlocking the brace rod to cause the second pair of side rails to be locked in the parallel relationship with the side rails for the two wheel cart. The locking means includes a latch rod mounted to the side rails for sliding movement in a substantially vertical plane along with locking means arranged adjacent each end and constructed and defined for receiving the brace rod and locking up the rod in a releasable arrangement. Yieldable means in the form of a spring or the like is secured between an individual side rail and an individual locking means for normally positioning each of the locking means into a locking position and yieldable therefrom upon the engagement of the brace rod therewith with sufficient force to cause the movement of the locking means in a direction to allow the brace rod to be positioned in a locking position and to be locked up. A foot operable release means are pivotably mounted to the side rails for the two wheel cart for receiving a releasing force to cause the sliding movement of the latch rod and the locking means away from its locking position thereby permitting the second pair of side rails to be pivoted outside of the locking means for commencing the conversion of the two wheel hand cart when the release means is actuated by the users foot and his hands are free to swing the second pair of side rails outwardly of the locking means.

BRIEF DESCRIPTION OF THE DRAWINGS

These and other features of the present invention may be fully appreciated when considered in the light of the following specification and drawings, in which:

FIG. 6 is a cross-sectional view taken along line 6—6 of FIG. 3 but illustrating the brace rod in dotted outline as it is entering the locking means;

FIG. 7 is a view similar to FIG. 6 but illustrating the brace rod in its locked position as illustrated in FIG. 3;

FIG. 10 is a cross-sectional view taken along the line 10—10 of FIG. 3 and illustrating the release mechanism in a released position after engagement with cart's user's foot shown in engagement with the release mechanism and thereby the released brace rod is free to be moved out of the locking means.

DETAILED DESCRIPTION OF THE PREFERRED EMBODIMENT

Figure 1:
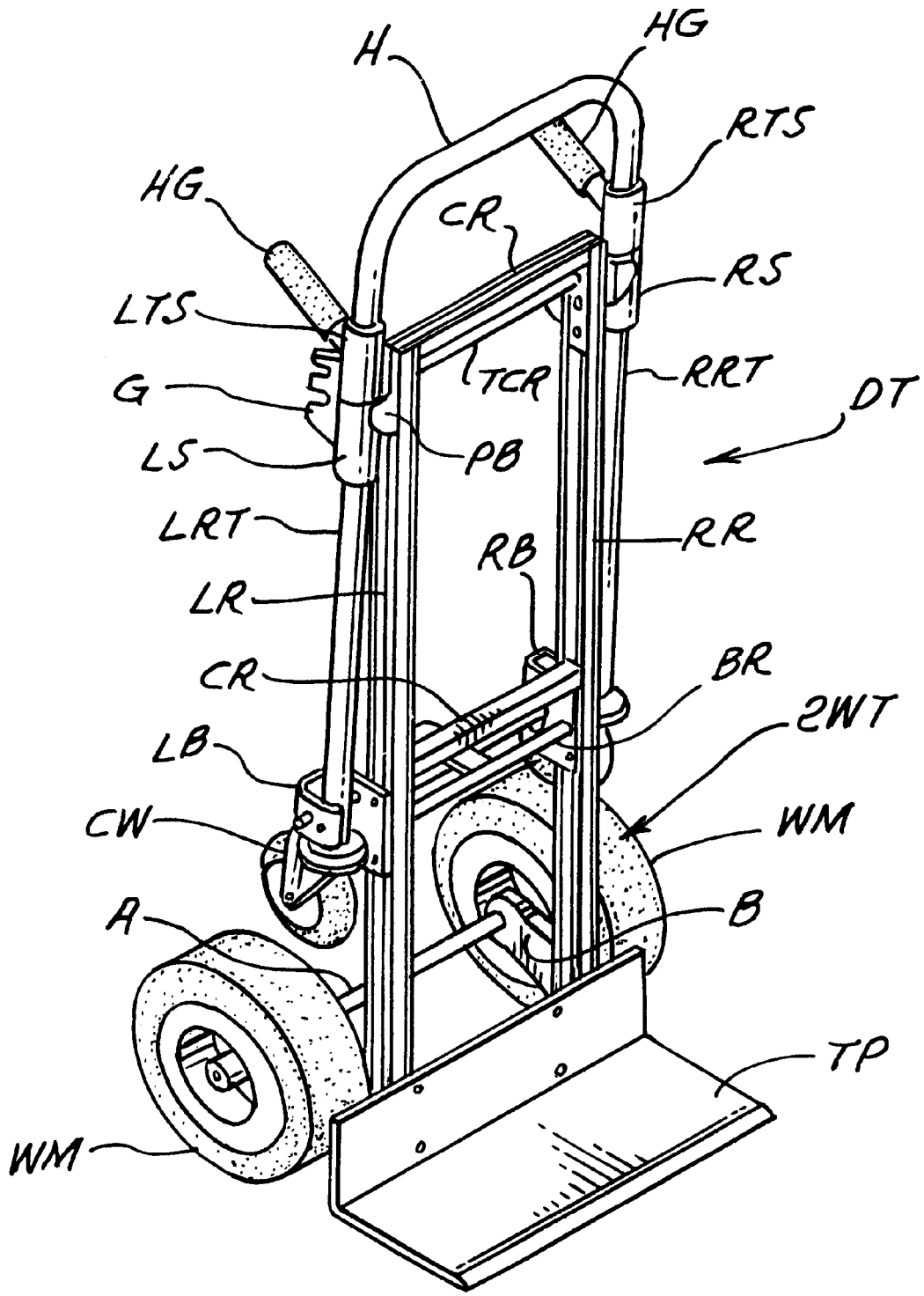
FIG. 1 is a front-side elevational view of the dual purpose hand cart illustrated in the two wheel cart configuration and the embodying the present invention.
Figure 2:
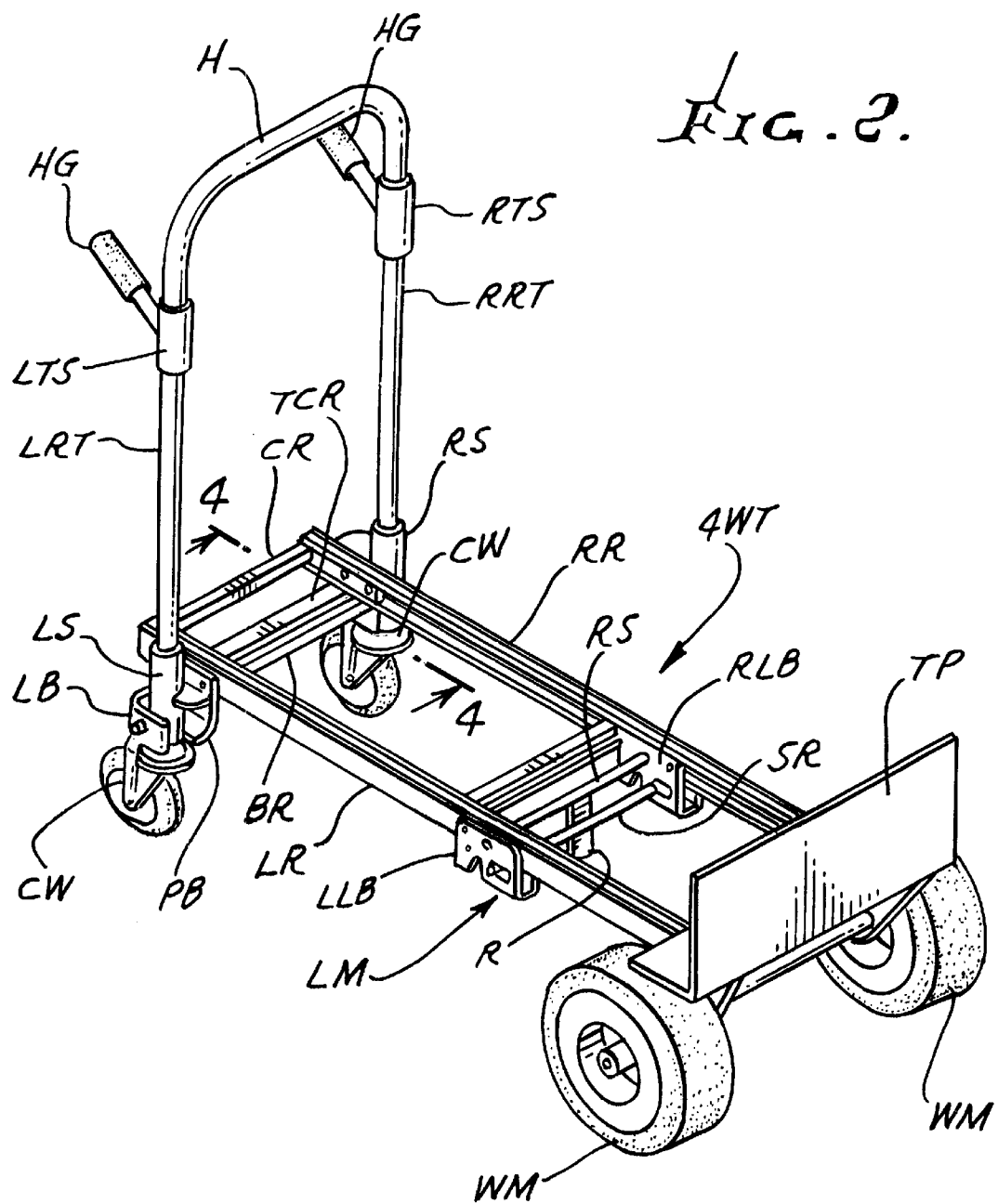
FIG. 2 is a perspective of the dual purpose hand cart of FIG. 1 illustrated in the four wheel cart configuration in accordance with the present invention.

Now referring to the drawings the inventive concept for the improved locking means LM will be described as it is applicable to a dual purpose hand cart DT convertible between a two wheel, upright or substantially vertical loading of materials as illustrated in FIG. 1 and a four wheel horizontal loading cart, as illustrated in FIG. 2 and back to a two wheel hand cart. The two wheel hand cart 2WT is of conventional construction and comprises a pair of spaced, longitudinally extending side rails LR and RR in the form of I-beam construction and a plurality of cross rails CR arranged in a longitudinally spaced relationship and joining the rails LR and RR as illustrated in FIG. 1, for example. A load bearing L-shaped toe plate TP is secured to and joins the lower ends of the side rails LR and RR to form a unitary structure for the two wheel hand cart 2WT. Axle means A is mounted to a pair of brackets B individually secured to the rails LR and RR. The brackets B each extend horizontally outwardly of the rails LR and RR in the opposite direction from the toe plate TP. The ends of the axle A mount wheel means WM mounting a pneumatic tire, as illustrated to complete the construction of the two wheel hand cart 2WT.

Figure 9:
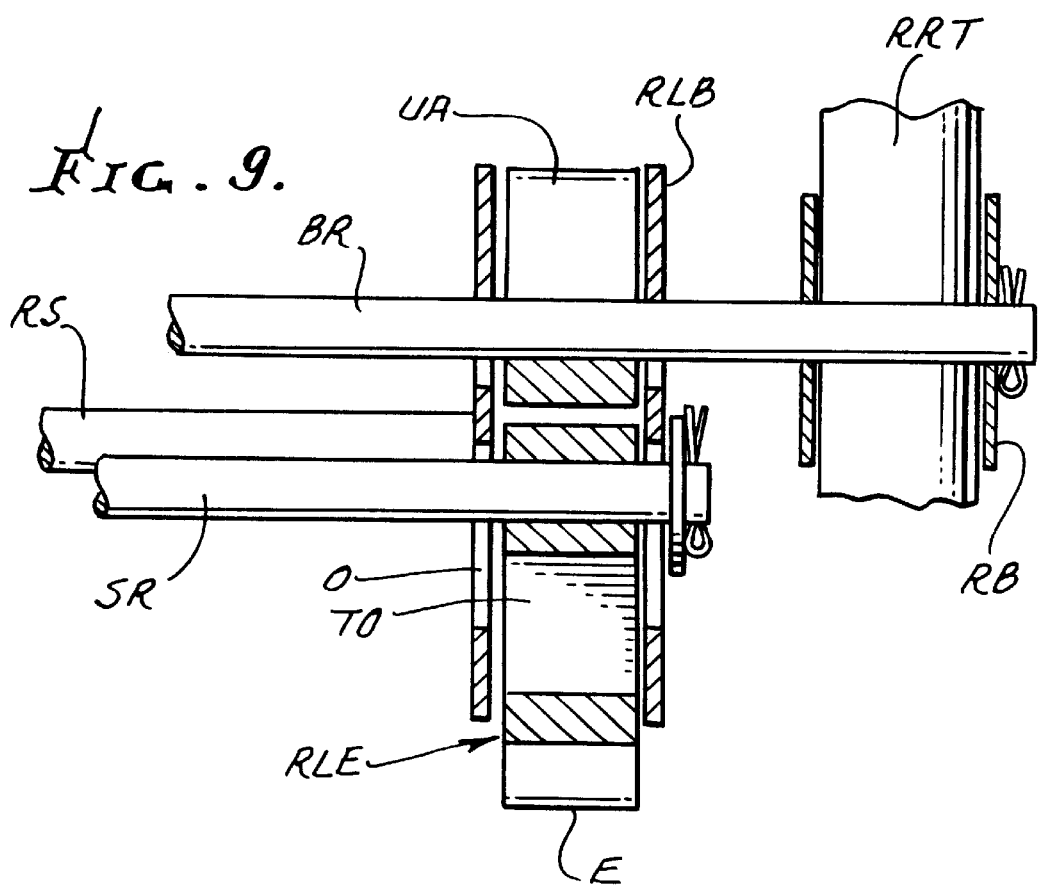
FIG. 9 is a cross-sectional view taken along line 9—9 of FIG. 7.

The four wheel hand cart configuration 4WT comprises a second pair of longitudinally extending side rails of a tubular configuration identified as the rails LRT and RRT, as best viewed in FIG. 2. The ends of the rails LRT and RRT individually mount the caster wheels CW. A bracket is mounted to and secured to each of the rails LRT and RRT adjacent the upper ends of the caster wheels CW, and are illustrated as the brackets LB and RB in the drawings. The brackets LB and RB are each of a U-shaped configuration and mount a brace rod BR that is suitably secured to the closed ends of the brackets, see FIG. 9, and in a plane spaced outwardly from the rails LRT and RRT. The upper ends of the rails LRT and RRT are secured together by an arcuate handle element H. In addition handle grips HG are secured to each of the rails LR and RR by means of tubular sections LTS and RTS. The handle grips HG are welded to individual tubular sections and arranged to extend angularly outwardly from the tubular sections as best seen in FIGS. 1 and 2. For converting the dual purpose cart to a four wheel cart, the rails LRT and RRT each mount a tubular sleeve LS and RS, respectively on the rails LRT and RRT abutting in a slidable relationship with the secured elements LTS and RTS so that the sleeves LS and RS slide along the tubular lengths of their respective rails in converting from the two wheel configuration to the four wheel configuration and back to the two wheel configuration. In FIG. 2 the sleeves LS and RS are illustrated at the lower extreme of the rails in abutting relationship with the brackets LB and RB when the caster wheels CW engage a supporting surface for defining the four wheel configuration of the hand cart. This is accomplished by swinging the rails LRT and RRT outwardly of the rails LR and RR, and tilting the rails away from the vertical position, as viewed in FIG. 1, to permit the caster wheels CW to engage a supporting surface while the tubular sleeves LS and RS slide downwardly from their position illustrated in FIG. 1 to engage their respective brackets LB and RB, as best seen in FIG. 2.

Figure 3:
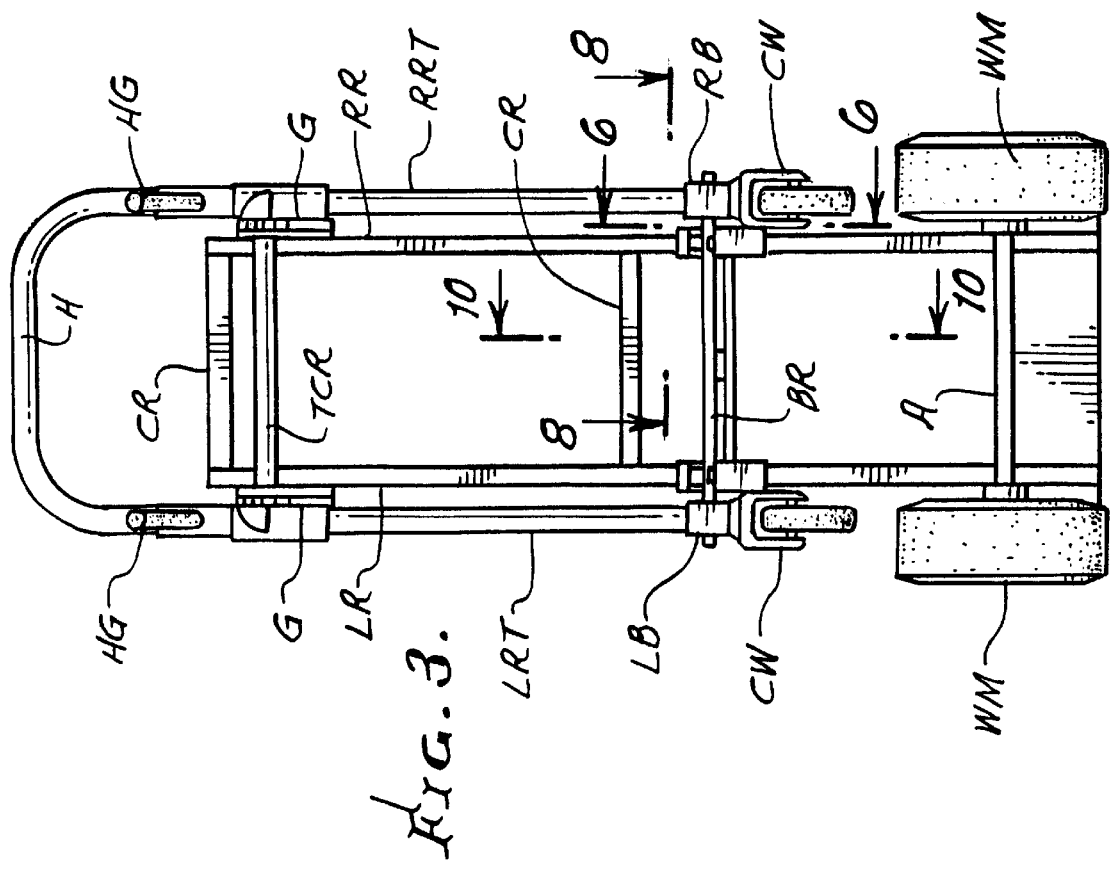
FIG. 3 is a rear elevational view of the dual purpose cart as illustrated in FIG. 1.

The above described hand cart configuration 4WT are pivotally secured to the side rails LR and RR by suitable fasteners permitting the pivoting action. For this purpose individual brackets PB are secured between the rails LR and RR and the rails LR and RR, and the rails LRT and RRT at the elements LTS and RTS. In addition, there is imposed a guide plate G constructed with a plurality of rod securing notches N between the brackets PB and the rails LR and RR at the upper ends of the rails. The guide plates G include a tubular cross rail TCR welded between the guide plates G, as illustrated in FIG. 3. The notches N for the guide plate G are constructed and defined for locking up the brace rod BR in the four wheel configuration, as best seen in FIG. 4 to form a unitary structure for the assembly 4WT.

Figure 4:
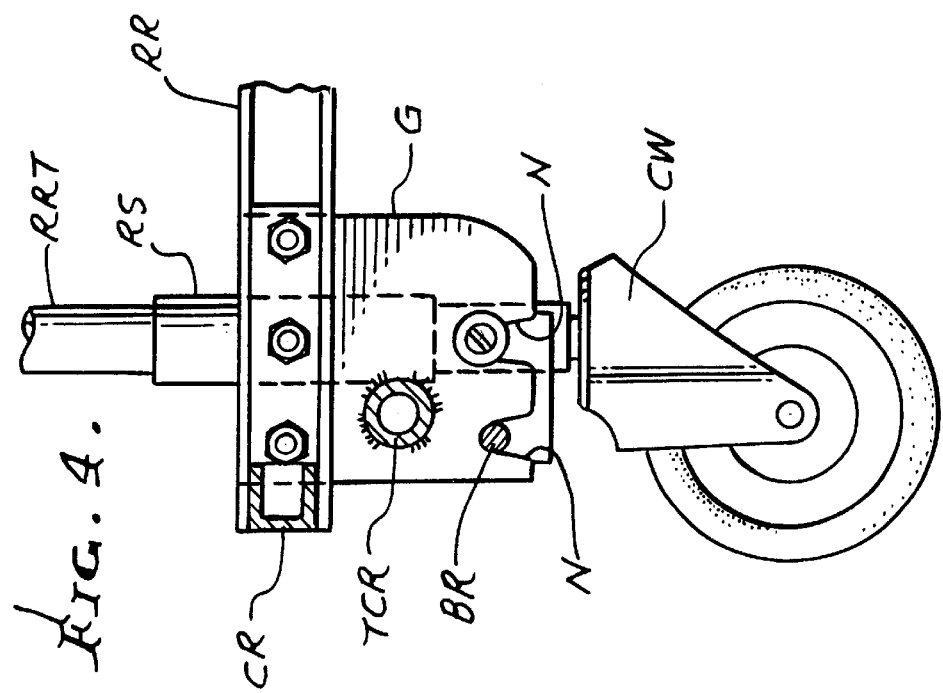
FIG. 4 is a cross-sectional view of the dual purpose cat taken along the line 4—4 of FIG. 2.
Figure 5:
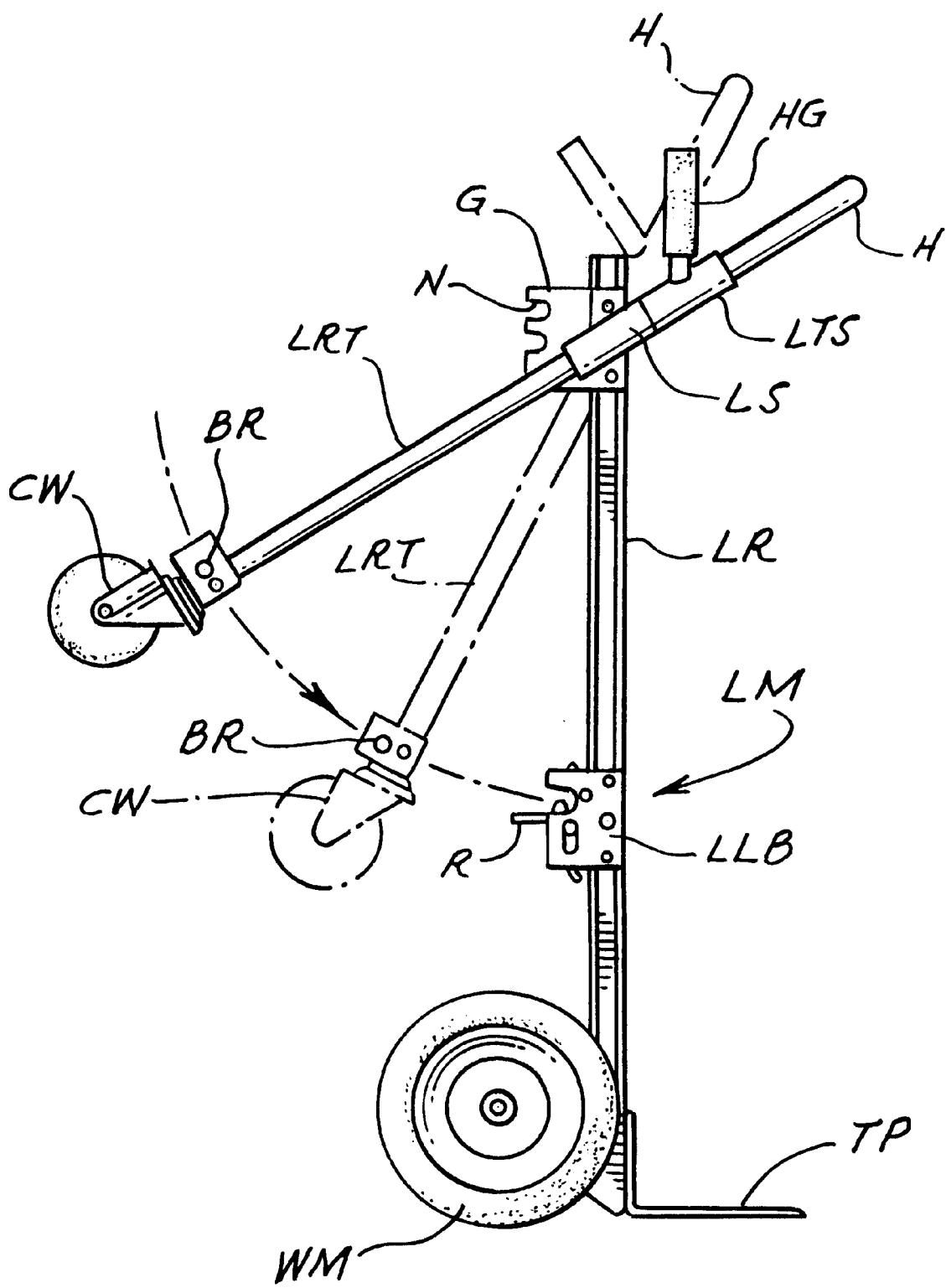
FIG. 5 is a side elevational view of the dual purpose cart of FIG. 1 illustrating the second pair of wheels unlocked from the locking means for the two wheel cart and being pivoted toward the locking means, including a position illustrated in dotted outline as it approaches the locking means.
Figure 8:
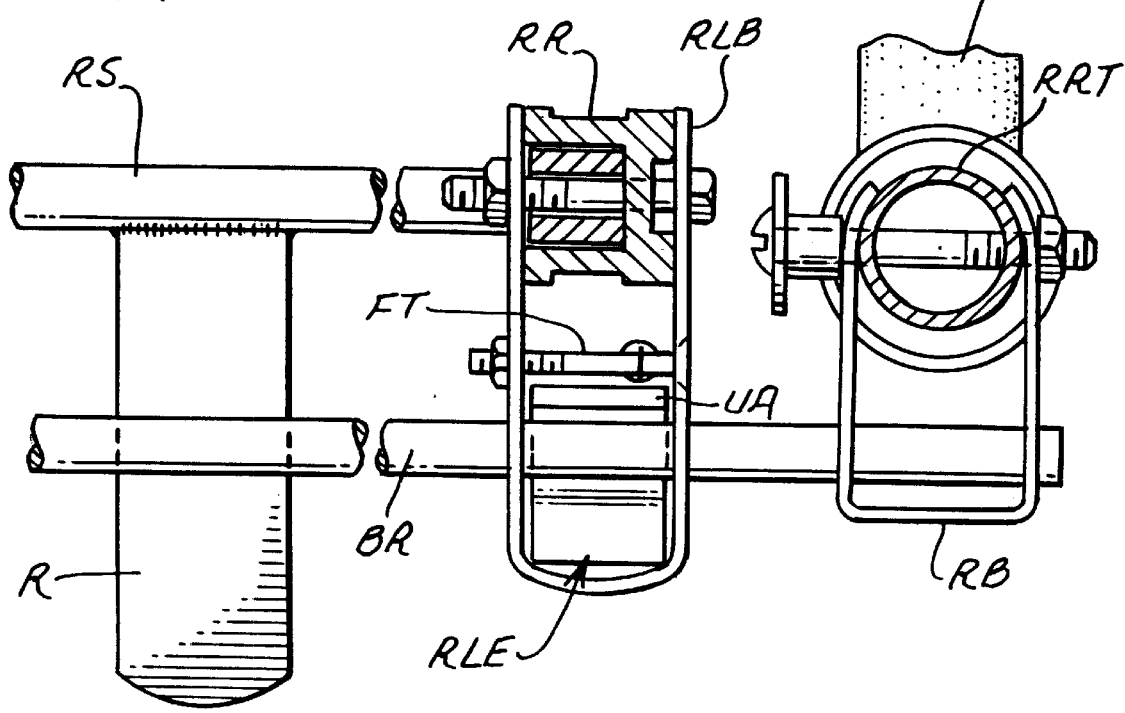
FIG. 8 is a cross-sectional view taken along the line 8—8 of FIG. 3.

The locking means LM of the present invention is secured between the side rails LR and RR intermediate their ends so as to receive and lock up the brace rod BR, as best appreciated from viewing FIGS. 4 and 5, when pivoted or swinging into engagement therewith. The locking means LM comprises a pair of locking brackets LLB and RLB secured by fasteners to the rails LR and RR, respectively, for the two wheel cart. The brackets LLB and RLB are similarly constructed in a generally U-shaped configuration with the opposite arms of the U being mounted to the opposite lateral sides of the rails for the two wheel cart and secured thereto by suitable fasteners, as illustrated. The brackets LLB and RRB extend outwardly of the rails LR and RR, respectively on the non-loading or back side of the rails, as illustrated in the drawings. The brackets LLB and RLB are constructed and defined for slidably mounting a speed latch rod means comprising a speed rod SR extending between the brackets and having latching or locking elements LLE and RLE secured adjacent each end of the speed rod SR to be movable in a vertical plane within the individual brackets. For this purpose, the parallel sides of the brackets LLB and RLB are each provided with coaxial apertures O of a generally oval configuration for accommodating the vertical movements, up and down, of the rod SR. The opposite ends of the speed rod SR are each provided with means for limiting the lateral movements of the rod, (see FIG. 9).

The locking elements LLE and RLE are mounted to the opposite ends of the speed rod SR and are arranged in the corresponding brackets LLB and RLB to be movable in unison with the speed rod. The locking elements LLB and RLB are each spring mounted for movement between a locking and unlocking position by means of the tension springs S. The spring S has one end secured to a fastener FT extending between the opposite arms of the bracket and secured thereto and adjacent, the bottom end of the locking element by a fastener FB, as seen in FIGS. 6 and 7. The springs S maintain the locking elements LLE and RLE in a normally locking position, see FIG. 7, and are yieldable to move downwardly upon being impacted by a suitable force applied thereto. For this purpose, the brackets LLB and RLB each are constructed with aperture LO on the back sides of the brackets to receive and accommodate the brace rod BR therein and allow the rod access to the locking elements LLE and RLE so that they both function in unison. To this end, the configuration of the top of the latching portion is constructed and defined to receive the impact of the brace rod BR as it moves into the aperture LO with sufficient force to cause the locking elements to yieldably move downwardly in response to the impact to permit the brace rod to enter inside the bracket and into the locking position to be locked up in that position. The shape of the locking elements at the latching end is advantageous defined with a U-like configuration with an arm defined as an inclined portion IP to slidably receive the rod BR, (see FIG. 6) as it slides upwardly along the incline IP and has sufficient force imparted to it to overcome the forces of the springs S and then ride down the opposite sides of the inclined portions IP and into the locking sockets LS and rest against the upstanding arms UA of the locking element. The entry end of the latching ends are vertically shorter than the parallel arm of the U configuration, see FIGS. 6 and 7. When the rod BR passes the locking points, the springs S force the locking elements and the speed rod SR back up and lock up the ends of the brace rod BR in the locked up position, as illustrated in FIG. 7. This structure is defined to minimize the wear on the locking elements and yet provide a more positive lock up of the brace rod BR. The remaining portions of the locking elements below the operative latching portion are constructed and defined as a solid block with a tapered edge TE terminating into a single end E with an aperture TO between the two sides of the locking elements and having a complimentary configuration as seen in FIGS. 6 and 7. The locking elements are mounted to move freely, up and down, within their respective brackets in accordance with the forces applied to the speed rod SR.

The locking means LM also includes a hands free release means for unlocking the brace rod BR when it is desired to convert the hand cart from the two wheel configuration to the four wheel configuration. The release from the locked up or locking position is provided by means of release element R secured by welding to a release rod RS rotatably secured to the rails LR and RR through coaxial apertures provided in the corresponding brackets LRB and RRB. The release rod RS is mounted slightly above the speed rod SR with the release element R resting thereon in its normal position. This hands free release allows the cart user to apply a foot to the release element R so as to cause the speed rod SR to move downwardly along with the locking elements from the normal locking position to release the brace rod BR. With the continued pressure applied to the release element R, the user can grasp the grips HG and swing the rails LRT and RRT out of the locking means LM in preparation for the conversion to the four wheel configuration of the dual purpose cart.

The operation of the locking means may now be summarized. When the dual purpose cart is in the four wheel configuration 4WT of FIG. 2, the brace rod BR is outside the locking means LM, as illustrated. At this time, the speed rod SR and the associated locking elements are in the locking position. In converting to the two wheel configuration 2WT, the two wheel configuration is elevated by lifting the structure at the cross rail CR, at the left hand end as illustrated in FIG. 2, so that the side rails LRT and RRT and guide G are disengaged from the brace rod BR while the sleeves LS and RS slide upwardly on their respective rails to its upper extremity so that the rails LRT and RRT can be swung into locking means LM, as best seen in FIG. 5. If the brace rod BR merely impacts the locking elements with a minimum of force, it will not enter the locking means. When sufficient force is employed to strike locking elements with sufficient force to cause it to yield and move downwardly, the brace rod BR will quickly enter the locking means LM and move into the locking sockets during the brief interval that the locking elements are held down against the force of the springs S. When the brace rod BR is positioned in the locking socket LS, the forces of the springs S move the locking means back up and thereby locking the brace rod BR. The brace rod BR is released by the application of the releasing force to the release element R causing the speed rod SR and the associated locking elements to move downwardly thereby allowing the brace rod BR to be swung outwardly of the locking means, To further minimize the wear on the locking means LM, the brace rod BR may be placed in the locked up position by merely applying the user's foot to the release element R for moving the speed rod SR downwardly so that the brace rod BR can be moved into the locking position without a substantial impact force applied to the locking elements. The user then need only swing the rails LRT and RRT into of the locking means LM.

The above described and illustrated convertible hand truck is advantageously designed to be constructed of aluminum elements or steel elements. The illustrated and described embodiment is constructed of aluminum elements. The steel configuration may be best for heavy duty use, the steel configuration can be further strengthened by adding a plurality of strengthening elements parallel and coextensive with the side rails LR and RR to form a more solid platform, that is particularly useful in the four wheel configuration for transporting extra heavy or bulky loads, as is particularly evident when examining FIG. 2.

It should now be evident to those skilled in the convertible hand cart art that the present invention provides an improved dual purpose hand cart employing improved locking means with fewer parts and providing more positive lock up of the wheel structure for the four wheel configuration without interfering with the operation of the two wheel structure. The conversion between the two wheel and four wheel configurations can be quickly made by the cart's users.

What is claimed is:

1. A method of locking a dual purpose hand cart convertible between a two wheel, upright hand cart and a four wheel horizontal hand cart and locking the wheel structure for converting the hand cart into a four wheel cart onto the two wheel cart yet permitting the two wheel cart to be normally used, said method comprising providing a two wheel hand cart having spaced, longitudinally extending side rails, providing a second pair of longitudinally extending side rails and normally arranged in a spaced, parallel relationship with the side rails for the two wheel hand cart and pivotably securing the second pair of side rails along the sides of the first mentioned pair, said second pair of side rails including a brace rod extending between said second pair of side rails and movable with the pivotal movements of said second pair of side rails, providing a speed rod mounting locking means for securement to the side rails for the two wheel cart and securing the speed rod and locking means to said side rails to permit the speed rod and locking means to slide in a substantially vertical plane relative to said side rails for locking and unlocking purposes in response to locking and unlocking forces applied thereto and normally residing in a locking position, and imparting a swinging movement to said second pair of side rails causing said brace rod to impact the locking means to cause said locking means to be momentarily slidably moved out of its locking position in response to the impact so the brace rod assumes a locking position and then the locking means automatically moves back to the locking position for locking up the brace rod in place.

2. A method of locking as defined in claim 1 including providing manual release means arranged with said speed rod operable for causing said speed rod and locking means to slide out of its locking position with the brace rod to permit the commencement of the conversion to the four wheel hand cart in response to a releasing force applied to the release means.

3. A method of locking as defined in claim 1 or 2 including providing foot operable release means arranged with said speed rod and locking means for causing the speed rod and locking means to slide out of its locking position with the brace rod to permit the second pair of side rails and the brace rod to be swung outside of the locking means in response to releasing force applied to the release means and thereby allow the locking means to again resume its locking position.

4. A dual purpose hand cart comprising
a two wheel hand cart characterized as including a pair of spaced, longitudinally extending rails,
a second pair of spaced longitudinally extending side rails carrying wheel means individual to each of said side rails and a brace rod extending between said side rails, means for pivotably securing said second pair of side rails to the side rails defining the two wheel cart so that the second pair of rails assumes a spaced, substantially parallel relationship with the side rails for the two wheel cart and swingable away from said parallel position to permit the wheels for the second pair of side rails to engage a supporting surface,
locking means secured to the side rails for the two wheel hand cart for locking up and unlocking the brace rod to cause said second pair of side rails to be locked in said parallel relationship with the side rails for the two wheel cart,
said locking means comprising a speed rod slidably mounted to the side rails for sliding movement in a substantially vertical plane relative to said side rails, said speed rod mounting locking means adjacent each end constructed and defined for receiving said brace rod and engaging the rod in a releasable locked position,
yieldable means secured between an individual side rail and an individual locking means for normally positioning each of said locking means into a locking position and yieldable to be slidably moved out of the locking position upon the engagement of said brace rod therewith with sufficient force to cause the movement of said locking means to allow the brace rod to be positioned in a locking position and to be locked up,
and manual release means pivotably mounted to said side rails for the two wheel cart for receiving a releasing force to cause the sliding movement of said speed rod and said locking means away from the locking position thereby permitting said second pair of side rails to be pivoted outside of said locking means when said release means is actuated.

5. A dual purpose hand cart as defined in claim 4 wherein said locking means mounted to said latch rod each comprise a locking structure having a U-like configuration with a pair of arms, the arm first engaging the brace rod being reduced in length from the other arm to yieldably allow the brace rod to slidably move against the other arm to be locked thereto when the speed rod is urged back into the locking position.

6. A locking mechanism for use on a dual purpose hand cart convertible between a two wheel, upright hand cart and a four wheel horizontal hand cart and back to a two wheeled hand cart comprising
a two wheel hand cart comprising a pair of spaced, longitudinally extending side rails and means for pivotably securing a second pair of longitudinally extending side rails with each said pair of side rails mounting caster wheels and a brace rod extending between the side rails adjacent the caster wheels and arranged to be pivotably moved from a parallel relationship with the side rails for the two wheel hand cart to a position spaced from said side rails,
the side rails for the two wheel hand cart mounting locking means for locking said second pair of side rails in a parallel relationship with the side rails for the two wheel hand cart,
said locking means comprising speed latching rod means extending between the side rails for the two wheel hand cart slidably mounted for substantially vertical movement between a locking and a non-locking position and normally arranged in a locking position,
said latching rod means mounting an individual locking element adjacent the ends of said latching rod means movable with the movements of said latching rod means,
and yieldable means individually secured to the locking elements for normally maintaining the locking elements in a locking position and yieldable in response to the engagement of the brace rod therewith to cause said locking elements and the latching rod means to be slidably moved out of the locking position for permitting the brace rod to move into the locking position and to be locked in position when the brace rod is arrested at the locking element and to be locked in place by the locking elements in response to said yieldable means, and means pivotably mounted between said side rails for manually releasing said brace rod from said locked position.

7. A locking mechanism as defined in claim 6 wherein the individual locking elements movable with said latching rod means, is characterized as each having a U-like configuration with the entry arm being shorter than the parallel arm of the U and presenting an inclined surface blocking entry into the locking element with the opposite surface being inclined in the opposite direction for defining a locking socket with the parallel arm of the U and extending vertically higher than said entry arm.

8. A dual purpose hand cart convertible between a two wheel, upright hand cart and a four wheel, horizontal hand cart and back to a two wheel hand cart comprising a two wheel hand cart having a pair of spaced, longitudinally extending side rails and a plurality of cross rails joining said side rails in a longitudinally spaced relationship along with a load bearing toe plate secured to and joining the lower ends of said side rails and to form a unitary structure for the two wheel hand cart, axle means mounting a wheel adjacent the opposite ends of the axle means and secured to said side rails, a second pair of spaced, longitudinally extending side rails joined at one end by handle means, each of said second pair of side rails mounting caster wheels means on the free ends of each of said rails and a brace rod extending between said side rails, and means secured to each of said side rails for supporting and securing said brace rod thereto, means for pivotably securing the second pair of side rails to the first mentioned pair of side rails including sleeve means slidably positioned on each of said second pair of side rails for slidably permitting the sleeve means to move between two preselected, end points on said second pair of side rails whereby they assume a spaced parallel relationship with the first mentioned side rails at one end point when a two wheel cart is defined and slidable to a second end point for a four wheel position permitting the caster, wheel means to engage a supporting surface when the four wheel cart is defined, said first mentioned side rails including mounting means for releasably locking said second pair of side rails to said spaced parallel relationship with the first mentioned side rails and releasable therefrom to permit said second pair of side rails to be swung to the four wheel configuration, said means for releasably locking said second pair of side rails comprising bracket means secured to each of said first mentioned side rails intermediate the ends thereof, said bracket means being constructed and defined for slidably mounting a latching rod extending between said bracket means for sliding movement between a locking position and a non-locking position, each end of said latching rod carrying latch means within each of said bracket means to be moved therewith, said latching means each being defined for releasably gripping said brace rod in a locking position, resilient means secured between an individual bracket means and an individual latch means for normally maintaining said latching means in a locking position and yieldable in response to a force applied to said latching means to cause the latching means to be slidably momentarily moved out of their locking position for substantially simultaneously receiving said brace rod, releasing rod means rotatably mounted between said bracket means and carrying a release element extending into engagement with said latching rod for exerting a releasing force onto said latching rod to unlock said brace rod thereby permitting said brace rod to be swung outwardly from said first mentioned side rails and when the releasing force is removed said latching means is moved to the locking position for receiving the brace rod when it is to be re-locked.

9. A dual purpose hand cart as defined in claim 8 wherein said latching means have a U-like latching configuration in cross-section with a relatively short rod entry arm and a long substantially parallel arm defining a locking socket between said arms.

10. A dual purpose hand cart as defined in claim 9 wherein said latching means is further characterized as blocking entry into the locking socket until it is imparted with sufficient force to overcome the resilient means and allow the brace rod to slide into the locking socket.

11. A dual purpose hand cart as defined in claim 8 wherein the structural components of the hand cart are constructed of aluminum.

12. A dual purpose hand cart as defined in claim 8 wherein the structural components of the hand cart are constructed of steel for heavy duty applications.

13. A method of locking a dual purpose hand cart convertible between a two wheel, upright hand cart and a four wheel horizontal cart and locking the wheel structure as defined in claim 1 including the steps of forming the locking means with a U-like locking element having a pair of locking arms, the locking arm of the locking element first engaging the brace rod is formed with a length that is less than the other arm to yieldably allow the brace rod to slidably move against said other arm to be locked thereto when the brace rod is arrested at said other arm of the locking element.

14. A method of locking as defined in claim 13 wherein the locking arm of the locking element having the shorter length is formed with an inclined surface blocking entry into the locking element with the opposite surface being formed with an incline in the opposite direction from said first mentioned inclined surface for defining a locking socket with said shorter locking arm and formed for extending vertically higher than said shorter locking arm whereby upon impact between the first mentioned inclined surface and said brace rod, the brace rod moves up said first mentioned inclined surface and then against said opposite surface for residing in the locking socket.

* * * * *